(12) United States Patent
Roth

(10) Patent No.: US 8,068,537 B2
(45) Date of Patent: Nov. 29, 2011

(54) COMMUNICATION CIRCUIT FOR A BI-DIRECTIONAL DATA TRANSMISSION

(75) Inventor: Bernhard Roth, Boeblingen (DE)

(73) Assignee: Verigy (Singapore) Pte. Ltd., Singapore (SG)

( * ) Notice: Subject to any disclaimer, the term of this patent is extended or adjusted under 35 U.S.C. 154(b) by 790 days.

(21) Appl. No.: 11/919,388

(22) PCT Filed: Mar. 2, 2006

(86) PCT No.: PCT/EP2006/060395
§ 371 (c)(1),
(2), (4) Date: Dec. 31, 2007

(87) PCT Pub. No.: WO2006/117255
PCT Pub. Date: Nov. 9, 2006

(65) Prior Publication Data
US 2009/0316764 A1    Dec. 24, 2009

(30) Foreign Application Priority Data

Apr. 29, 2005    (EP) .................................. 05103599

(51) Int. Cl.
*H04L 5/14* (2006.01)
(52) U.S. Cl. ........ 375/219; 375/220; 375/257; 375/258; 327/108; 327/317; 327/319; 327/362; 370/272; 370/273; 370/276; 370/297; 455/73
(58) Field of Classification Search .................. 375/219, 375/220, 257, 258; 327/108, 317, 319, 362; 370/272, 273, 276, 297; 455/73
See application file for complete search history.

(56) References Cited

U.S. PATENT DOCUMENTS
4,679,188 A    7/1987    Fukuda et al. .................. 370/29
(Continued)

FOREIGN PATENT DOCUMENTS
EP    859318    8/1998
(Continued)

OTHER PUBLICATIONS

Martin, et al., "*8Gb/s differential simultaneous bidirectional link with 4mV 9ps waveform capture diagnostic capability*", Solid State Circuits Conference, 2003, Digest of Technical Papers. ISSCC, Feb. 9, 2003, pp. 1-10.

Casper B., et al, "*An 8Gb/s simultaneous bidirectional link with on-die waveform capture*", IEEE Journal of Solid-State Circuits, vol. 38, No. 12, Dec. 2003, pp. 2111-2120.

(Continued)

*Primary Examiner* — Leon Flores
(74) *Attorney, Agent, or Firm* — Holland & Hart, LLP

(57) ABSTRACT

A communication circuit for providing a bi-directional data transmission over a signal line, thereby receiving a first digital data stream and transmitting a corresponding first signal into a near end of a signal line to a remote device, the remote device being connected to a far end of the signal line, receiving a second signal at the near end of the signal line from the remote device and deriving a second digital data stream therefrom, having a replica generator for providing, in response to the first digital data stream or a signal derived therefrom, a replica signal, and an extraction circuit for extracting the second digital data stream from the second signal in response to the replica signal and a comparator signal deduced from the near end of the signal line and an automatic test equipment having a plurality of communication circuits each providing a bi-directional data transmission.

10 Claims, 8 Drawing Sheets

U.S. PATENT DOCUMENTS

| | | |
|---|---|---|
| 5,453,995 A | 9/1995 | Behrens |
| 5,499,248 A | 3/1996 | Behrens et al. |
| 5,815,528 A | 9/1998 | Koga et al. |
| 5,999,022 A | 12/1999 | Iwata et al. |
| 6,064,242 A | 5/2000 | Yoshiba |
| 6,573,764 B1 * | 6/2003 | Taylor ........................... 327/108 |
| 6,621,323 B1 | 9/2003 | Casper et al. ................. 327/379 |
| 6,744,287 B2 | 6/2004 | Mooney et al. ............... 327/108 |
| 6,756,817 B2 | 6/2004 | Tamura et al. ................. 326/86 |
| 6,944,239 B2 | 9/2005 | Cecchi ........................... 375/316 |

FOREIGN PATENT DOCUMENTS

| | | |
|---|---|---|
| EP | 864977 | 9/1998 |
| EP | 882991 | 12/1998 |
| EP | 886214 | 12/1998 |

OTHER PUBLICATIONS

International Search Report dated Jul. 11, 2006 from PCT/EP2006/060395.

* cited by examiner

| R1 | R1a | R1b | DA | CA | TA |
|---|---|---|---|---|---|
| 55 | 390 | 160 | 0.818 | 0.710 | 0.580 |
| 60 | 225 | 75 | 0.667 | 0.750 | 0.500 |
| 70 | 144 | 31 | 0.429 | 0.825 | 0.333 |
| 75 | 128 | 22 | 0.333 | 0.856 | 0.285 |

VTH1 = VHI1 / 2 - R3 / 2 * I1 + VHI1' / 2 - R3' / 4 * ( I1' + I1a' )
R3a = R3/ 2 * ( I1 / I1a - 1 )
s/e-swing = R3/ 2 * ( I1 - I1a )

R3a = R3Na = R3/ 2 * ( I1 / I1a - 1)
s/e-swing = R3/ 2 * (I1 - I1a)

$R3a = R3Na = R3/2 * (m/n - 1)$ $s/e\text{-}swing = I * (m - n) / (m + n) * R3/2$ $$R3a = R3/2 * m/n$$
$$s/e\text{-swing} = I1 * m/(m+n) * R3/2$$

COMMUNICATION CIRCUIT FOR A BI-DIRECTIONAL DATA TRANSMISSION

BACKGROUND

1. Field of the Disclosure

The present disclosure relates to a bi-directional data transmission.

2. Discussion of the Background Art

In communication systems, it is often necessary to transfer data in both directions over the same physical communication link. In communication systems with such bi-directional communication links, the communication terminals provided at each end of a bi-directional communication link comprise each a transmitter and a receiver associated to each other for transmitting and receiving data respectively.

Transferring data in both directions over the same physical line necessitates separating the data flow of the both directions; it is thus necessary to prevent a receiver from mixing of a signal transmitted by the associated transmitter and a signal received from another transmitter.

To avoid a signal mixing, it is well known to establish a method, wherein a transmitter is only allowed to transmit data if no data is received at the same time. However, due to a transmission time depending on the length of the line, a corresponding waiting time, also referred to as roundtrip time, has to be additionally taken into account.

Integrated circuits with high data rates, also referred to as high speed integrated circuits and further also generally referred to as device under test -DUT., face the problem that an automatic test equipment -ATE- for testing such circuits needs to take into account increasing roundtrip times, as for high-speed testing the data direction between ATE and DUT is changing frequently. Therefore, to avoid the impact of roundtrip times, U.S. Pat. No. 6,064,242 describes a test setup wherein a driver and a comparator in an ATE are separated and each connected over independent lines to a device under test.

In the article "An 8-Gb-/s Simultaneous Bidirectional Link With On-Die Waveform Capture", IEEE Journal of Solid-State Circuits, Vol. 38, No. 12, December 2003, a method is disclosed that allows for simultaneously transmitting and receiving digital data over a physical link. According to this article, a comparator threshold at a receiver for detecting a received digital data stream is switched according to the actual value of a transmitted digital data stream.

SUMMARY

According to an embodiment of the disclosure, a communication circuit is provided for providing a bi-directional data transmission over a signal line, the communication circuit being adapted for receiving a first digital data stream and for transmitting a corresponding first signal into a near end of a signal line to be transmitted to a remote device, the remote device being connected to a far end of the signal line, the communication circuit being adapted for receiving a second signal at the near end of the signal line from the remote device and for deriving a second digital data stream from this signal, the communication circuit having: a signal generator adapted for providing a first driver signal at a first generator output and a second driver signal at a second generator output, each in response to the first digital data stream, an interface circuit adapted for providing, in response to the first driver signal and the second driver signal, the first signal to be transmitted to the near end of the signal line; and an extraction circuit adapted for detecting the second digital data stream, in response to a comparator signal deduced from the near end of the signal line and the second driver signal.

According to an embodiment of the present disclosure, a communication circuit is connected to a communication line for transmitting to the communication line a first data signal in response to a first digital data stream, receiving from the communication line a second data signal and generating a second digital data stream in response to the received second data signal. Therefore, a signal generator is provided that generates a first driver signal and a second driver signal each in response to the first digital data stream. Further a signal interface circuit is provided that receives the first driver signal and the second driver signal and generating the first transmission signal in response to these signals. In the opposite direction, the interface circuit receives the second transmission signal from the communication line and generates a comparator signal in response to the second transmission signal and to the first driver signal. A signal receiver generates the second digital data stream in response to the comparator signal and the second driver signal, wherein the second digital data stream corresponds to a bit stream information within received transmission signal.

In a further embodiment, the first driver signal and second driver signal are complementary to each other, i.e. if the first driver signal is toggling from its high value to its low value, the second driver signal changes from its low value to its high value and vice versa.

The effect of the first driver signal to the received transmission signal is reduced or even eliminated by the second driver. The signal receiver does not mix the data information from the first and the second data signal. Therewith, the comparator signal is independent from a toggling of the first digital data stream.

This has the advantage that no active signal correction has to be applied, e.g. by actively switching comparator thresholds of a signal receiver between two defined values depending on the actual data values of the digital data to be transmitted. Thus, there is no time matching necessary between signal generator and signal receiver.

In a further embodiment, an ATE having a plurality of per-pin electronic circuits adapted to be connected over a plurality of transmission lines to corresponding pins of a device under test -DUT-, wherein the ATE has a plurality of communication circuits as described above for connecting to one of the plurality of transmission lines, wherein each tester node comprises means for reducing or elimination the effect of the own transmission signal to the signal received from the corresponding DUT pin. This allows for testing high-speed integrated circuits with bi-directional ATE, the distance between the DUT and ATE's electronics being significantly long.

In a further embodiment, a method for a bi-directional data transmission over a signal line, may have the steps of: receiving a first digital data and transmitting a corresponding first signal from a near end of a signal line to a remote device connected to a far end of the signal line, receiving a second signal at the near end of the signal line originating from the remote device and deriving second digital data from this signal, providing, in response to the first digital data or a signal derived there from, a replica signal generating in a generator a first driver signal and a second driver signal each in response to a first digital data stream, wherein the second driver signal represents the replica signal, combining in an interface circuit the first driver signal and the second driver signal, and providing a first transmission signal to a signal line, receiving at the interface circuit a second transmission signal from the signal line and generating a comparator signal in response to the second transmission signal and to the first driver signal, detecting, in response to the comparator signal and the second driver signal, the second digital data, and extracting the second digital data from the second signal in response to the replica signal and the comparator signal.

Therefore, each tester node might comprise a replica generator creating a signal directly dependent on the input of the driver, the output of the driver or a combination of both input and output of the driver. An extraction circuit takes the output of the replica generator and the signal at the tester node and extracts signals which are substantially representing the signals which have been generated at the DUT output. These outputs of the extraction circuit then are provided to a comparator whose output provides a digital data similar to the signal received from the DUT.

BRIEF DESCRIPTION OF THE DRAWINGS

Other objects and many of the attendant advantages of embodiments of the present disclosure will be readily appreciated and become better understood by reference to the following more detailed description of embodiments in connection with the accompanied drawings. Features that are substantially or functionally equal or similar will be referred to with the same reference signs.

FIG. 9c shows a first exemplary realization with respect to FIG. 9a, and FIG. 9d shows a second exemplary realization with respect to FIG. 9a.

DETAILED DESCRIPTION

Figure 2:
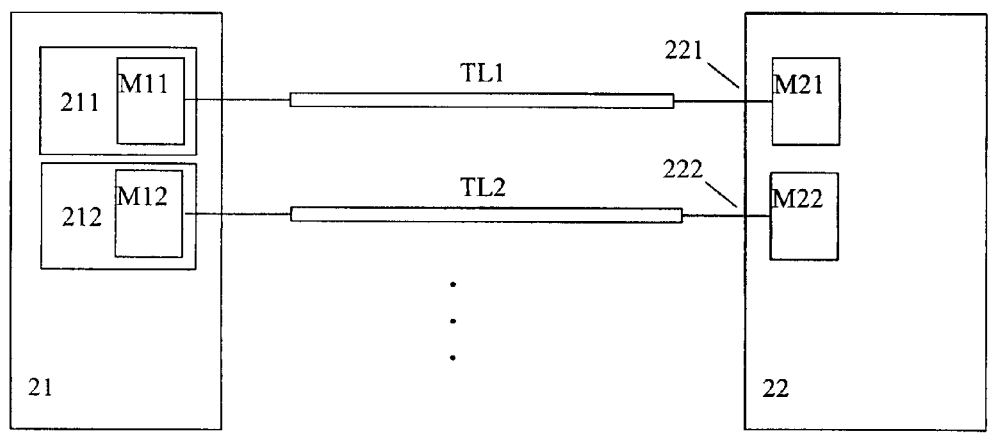
FIG. 2 shows a test setup with an automatic test equipment and a device under test connected via a plurality of bi-directional communication lines according to a further embodiment of the invention.

FIG. 2 shows an embodiment of a test setup with an automatic test equipment -ATE-21 comprising a plurality of channels 211 and 212, wherein exemplarily each of the channels comprise an ATE pin electronic circuit M11 or M12, also being referred to as (ATE) communication circuits, and a device under test -DUT-22 comprising a plurality of DUT pin circuits M21 and M22. Each ATE pin electronic circuit M11 or M12 is connected to one of a plurality of bi-directional transmission lines TL1 and TL2. Each the far end of the transmission lines TL1 and TL2 is connected over a DUT pin 221 or 222 to one of the DUT pin circuits M21 or M22.

As data rates in present test systems are extremely high (e.g. 3 Gigabits per second), it is important to avoid any waiting times at the communication level. The invention allows communicating between the ATE 21 and DUT 22 at high speed.

The ATE is by way of example an ATE based an a per-pin architecture, wherein the pins of the DUT are connected to each an ATE pin electronic that generate test sequences and receive response data independently from each other coordinated by a common control circuit. Examples for ATE with per-pin architecture are the Agilent 83000 and 93000 families of Semiconductor Test Systems of Agilent Technologies. Details of those families are also disclosed e.g. in EP-A-859318, EP-A-864977, EP-A-886214, EP-A-882991, U.S. Pat. No. 5,499,248 and U.S. Pat. No. 5,453,995.

Figure 9A:
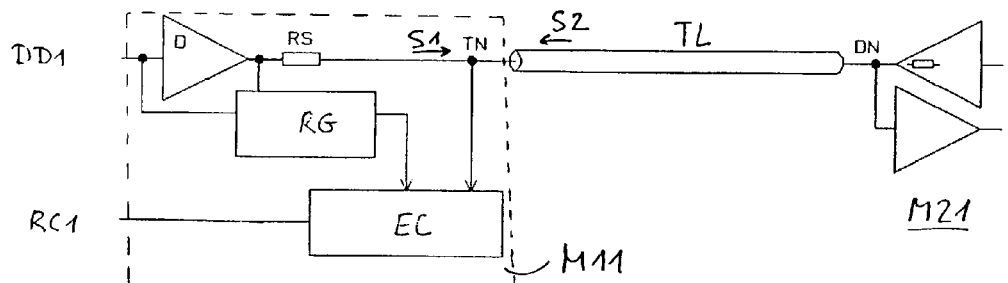

FIG. 9a shows a bi-directional communication setup exemplarily showing a first communication circuit M11 connected to a near end of a transmission line TL and a second communication circuit M21, connected to a far end of the transmission line TL. The first communication circuit M11 comprises a driver circuit D, a circuit resistor RS a replica generator RG, and an extraction circuit EC. A digital signal input providing the first digital data stream DD1 is connected each to an input of the driver circuit D and to an input of the replica generator RG. An output of the driver D is connected over the circuit resistor RS to each an ATE node or pin TN and to a second input of the replica generator RG. An output of the replica generator RG and the ATE node TN are connected to each an input of the extraction circuit EC that provides an output signal RC1 to the digital signal output.

The first and the second communication circuit M11 and M21 might be similar, but they can also be different. In the following, embodiments of communication circuits according to the invention will be described in details.

The driver D receives the digital data stream DD1 at its input and generates at its output a driver signal having a voltage toggling between a high voltage level and a low voltage level corresponding to the toggling of the digital data stream, i.e. the first driver generates the high voltage level, if a value "1" is received and generates the low voltage level, if a value "0" is received at its input. This signal is provided over the circuit resistor RS to the signal line TL.

The replica generator RG receives the digital data stream DD1 itself and/or the driver signal generated by the driver D. At its output, the replica generator RG provides a replica signal that is substantially proportional to the driver signal (e.g. being multiplied by a constant factor or shifted by a constant value with relation to amplitude and/or time).

For the following example, it will be assumed that the communication circuit M11 is matched to the characteristic impedance R of the transmission line TL in order to avoid unwanted reflections. As the output resistance of the driver D can be regarded to be zero, the resistance seen from the transmission line TL towards the first communication circuit M11 equals to the circuit resistor R. Therefore, the circuit resistor RS is chosen to be similar to the characteristic impedance R of the transmission line TL. The replica signal is chosen to be substantially similar to driver signal divided by two. The extraction circuit EC receives the replica signal and the signal picked from the signal line terminal TN. The signal picked from this terminal TN is a superposition of the first driver signal S1 generated by the first communication circuit M11 and the second signal S2 generated by the remote communication circuit M21. The extraction circuit EC combines signal picked from the terminal TN and the replica signal in order to substantially derive the second signal S2 containing the digital information generated by the remote device therefrom.

Figure 9B:
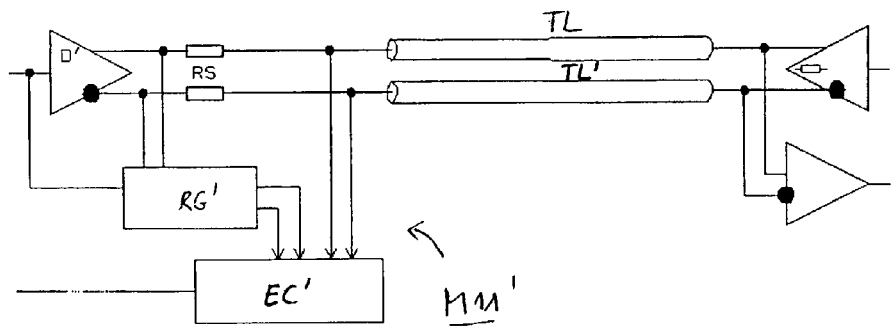
FIG. 9b shows a variation of FIG. 9a with a differential data link.
Figure 9C:
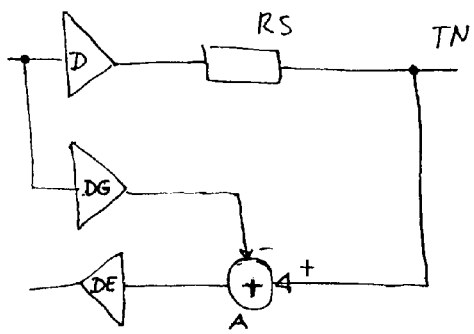

FIG. 9c shows a first exemplary realization of the replica generator RG and the extraction circuit EC. The replica generator picks up the digital data stream received at the driver D and provides this signal to a replica driver DG. The replica driver DG generates a signal that shows half the amplitude with regard to the signal generated by the driver D. The extraction circuit comprises an adding circuit A that generates a difference signal of the difference between the replica signal and the signal picked up from the terminal TN. As the circuit resistor RS and the characteristic impedance R of the transmission line TL are equal, the difference signal ideally dos not show an influence of the driver signal and therewith forms a pure replica of the signal generated by the remote device. An extraction circuit comparator DE extracts the digital data content RC1 from this signal.

The drivers D and DG can be realized as digital drivers or as linear amplifiers.

The drivers D and DG might comprise pre-emphasis means for compensating a frequency dependent signal loss from the first communication circuit M11 to the remote circuit M21 (sender direction).

The comparator DE might comprise an equalization function for compensating a frequency dependent signal loss from the remote circuit M21 to the communication circuit M11 (receiving direction).

The first communication circuit M11 and/or the remote circuit M21 might send and receive data at the same time.

Figure 9D:
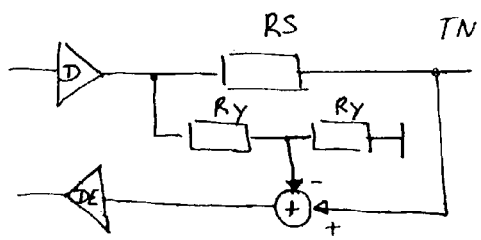

FIG. 9d shows a variation with respect to the realization of FIG. 9c. Instead of the replica driver DG, two resistors Ry are connected in series between the output of the driver D and ground. The connection between the resistors Ry is connected to the adder instead of the output of the replica driver.

FIG. 9b shows a variation of FIG. 9a with differential communication circuit M11' for a communication in parallel over a first transmission line TL and a second or complementary transmission line TL'. The first transmission line TL1 and the complementary transmission line TL' might be spatially coupled thus forming a so-called differential line with a differential impedance. The communication circuit M11' comprises a differential data link, comprising a differential driver D', a differential replica generator RG' and a differential extraction circuit EC'. Further realization details can be drawn from the description of FIG. 5, FIG. 6a and FIG. 7a.

Figure 1:
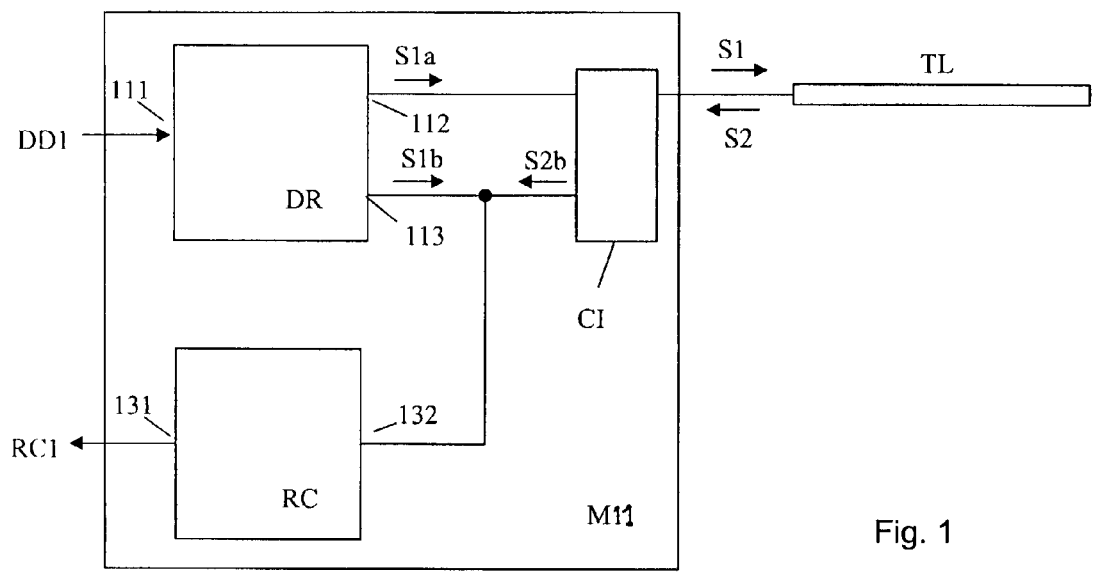
FIG. 1 shows a principle block diagram of a communication circuit according to an embodiment of the invention.

FIG. 1 shows principle block diagram of a further embodiment exemplary of the first communication circuit M11. The (first) communication circuit M11 can be applied as alternative connected to a transmission line TL. The communication circuit M11 comprises a signal generator DR comprising a generator input 111, a first generator output 112 and a second generator output 113, a signal receiver RC with a receiver input 132 and a receiver output 131, and an interface circuit C1.

The first Output 112 of the signal generator provides a first driver signal S1a, and the second output 113 of the signal generator provides a second driver signal S1b to the interface circuit C1. The interface circuit C1 provides a first transmission signal S1 to a near terminal or end of the transmission line TL Further, a second transmission signal S2 is received at the same terminal, which is generated by a remote communication circuit (not shown) at a remote end of the transmission line TL.

The first digital data signal comprises a stream of binary values e.g. represented by the values "0" and "1". The first and second driver signal (S1a, S1b) generated by the signal generator DR are physical signals for being transmitted over a physical transmission channel, wherein the transmission channel can be realized as wired electrical connection, as wireless radio connection or as a combination of both wired and wireless connection. These signals show a sequence of current or voltage pulses corresponding to the digital data sequence of the input digital data stream. Each data shows either a first value, further referred to as "0" or a second value, further referred to as "1". The drivers generate for each of these values a certain physical pulse, e.g. a voltage of zero Volt for the value "0" and a voltage of two volt for the value "1" first pulse. The format or modulation of this example is also referred to as so-called non-return-to-zero (NRZ). Another example is the so-called return-to-zero (RZ) format, wherein the pulse width of the high pulse is smaller that the bit cycle of the data signal. Generally, the pulses might have any suitable format.

In an embodiment, the first and second driver signals are generated to be complementary with respect to the digital values of the input digital signal DD1; this means that the signal swing, i.e. the current or voltage difference between the pulses referring to the different values of the input digital signal DD1, of an addition of both driver signals is zero or at least reduces with respect to the signal swing of the first driver signal S1a.

The interface circuit C1 combines the first and second driver signal S1a and S1b to the first transmission signal S1 to be transmitted into the transmission line TL. In case of a passive combination of complementary driver signals, the signal swing of the transmission signal is reduced with respect to the first driver signal.

Simultaneously to transmitting the first transmission signal S1, the second transmission signal S2 is received from the transmission line at the same terminal, thus the first driver signal S1a and the second transmission signal S2 are inevitably mixed at this terminal. The interface circuit C1 provides the comparison signal in response to the mixed signal received at the transmission line terminal. The signal receiver RC connected to another terminal of the interface circuit C1 receives an addition of both the second driver signal S1b and the comparison signal S2b provided by the interface circuit C1.

The characteristics of the interface circuit C1, e.g. its impedance with respect to the its terminals connected to the signal generator DR are chosen such that the effects of the first driver signal S1a and second driver signal S1b cancel out at the comparator input 132 at least to such degree that the signal receiver is able to properly detect the data content of the second transmission signal S2.

Figures 3A, 3B:
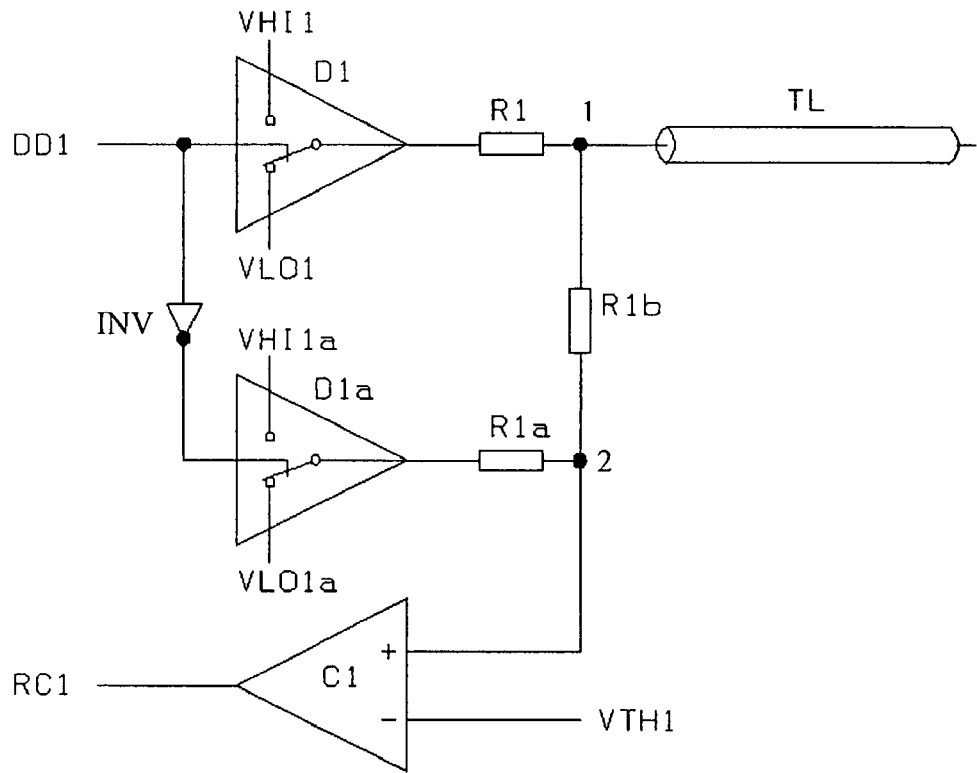
FIG. 3a shows an electrical circuit representing a first embodiment of the communication circuit of FIG. 1.
FIG. 3b shows a table with exemplary resistor and attenuation values pertaining to the electrical circuit of FIG. 3a, FIG. 4a shows an electrical circuit representing a second embodiment of the communication circuit of FIG. 1.

FIG. 3a shows an electrical circuit representing a further embodiment of the communication circuit M11 of the previous figures. The interface circuit C1 comprising a first terminal 1 and a second 2 is realized as a single interface resistor R1b. The first terminal 1 is connected to the near end of the transmission line TL and, via a first resistor R1, to the output of a first driver D1. The second terminal 2 is connected, via a second resistor R1a, to the output of a second driver D1a and to a first input (+) of a voltage comparator C1.

The first driver D1 receives the digital data stream DD1 at its input and generates at its output a voltage toggling between a first high voltage VHI1 and a low voltage VLO1 corresponding to the toggling of the digital data stream, i.e. the first driver generates the first high voltage VHI1 if a value "1" is received and generates the first low voltage VLO1, if a value "0" is received at its input.

The second driver D1a receives over an inverter INV an inverted digital data stream at its input and generates at its output a voltage toggling between a first high voltage VHI1 and a low voltage VLO1 corresponding to the toggling of the inverted digital data stream, i.e. the second driver D1a generates the second high voltage VHI1a, if the digital data stream DD1 shows the value "0", and generates the second low voltage VLO1a, if the digital data stream DD1 shows the value "1".

The first and second drivers D1 and D1a can be realized as digital drivers or as linear amplifiers.

In principle, the voltage levels of the first driver D1 and the second driver D1a might have different values. In the following, it is assumed that the first high voltage VH1 of the first driver D1 is equal to the second high voltage VH1a (VH1=VH1a) of the second driver D1a, and the first low voltage VL1 is equal to the second low voltage VL1a (VL1=VL1a).

The outputs of both drivers D1 and D1a are connected over a resistor network comprising the first resistor R1, the second resistor R1a and the third resistor R1b to the transmission line TL.

The signal receiver RC is realized as a voltage comparator C1, whereof the positive input is connected to the second terminal 2 and the negative input is connected to a threshold voltage VTH1.

The second digital data stream is not influenced by any toggling of the first and second driver signals. Thus, in an ideal case, the positive input of the comparator does not change at all when DD1 is toggling. This is achieved by choosing appropriate values for the first resistor R1, the second resistor R1a and the interface resistor R1b.

A first condition for determining the resistor values R1, R1a and R1b is that the network must be matched to the characteristic impedance R of the transmission line TL to avoid reflections. The output resistances of the drivers D1 and D1a can be regarded to be zero. Thus, the resistance seen from the transmission line TL towards the first communication circuit M11 results in a parallel connection of the first resistor R1 and the sum of the second resistor R1a and the interface resistor R1b:

$$R=(R1\cdot(R1a+R1b))/(R1+R1a+R1b)$$

Another condition to be met is that the voltage change at the second terminal 2 due to a toggling of the first data stream DD1 is below a certain value, so that such a toggling has no effect to the second digital data stream RC1 generated by the comparator C1 in response to a voltage difference between the second terminal 2 and the threshold voltage VTH1. In the following it is assumed that this voltage change is zero.

It is desirable to achieve a minimum attenuation value compared to a reference setup comprising of only a first driver and a first resistor of the same value of the transmission line impedance. For this reference setup, the voltage swing at the transmission line is half of the voltage swing at the reference driver (=VHI1−VIO1). For power and accuracy reasons, the additional driver attenuation due to the combination of complementary drivers should be reasonable small. Also, the additional receiver attenuation of the second transmission signal from the transmission line TL via the interface resistor R1b to the comparator C1 should reasonable small.

Possible relations of the three resistor values can be calculated analytically. Another possibility to determine these values is performed by simulations or measurements. A reasonable result from simulations have been found out as follows:

$$R1=1.2\cdot R,\ R1a=4.5\cdot R,\ \text{and}\ R1b=1.5\cdot R$$

FIG. 3b shows a table with exemplary values for the resistors and the corresponding attenuations for a transmission line impedance R=50 Ohms:

The first to third columns show exemplary values of the first resistor R1, the second resistor R1a and the interface resistor R1b in Ohms. The fourth to sixth columns show the corresponding driver attenuation DA, the receiver or comparator attenuation CA and the total attenuation TA that is the multiplication of the driver attenuation RA and the comparator attenuation DA, wherein the value 1 refers to zero attenuation and the value 0 refers to a total attenuation. The total attenuation TA represents the ratio of the signal at a comparator at the far end and a corresponding signal of the reference setup described above, assuming that the communication circuit at the far and is similar to the communication circuit at the other end.

For the examples listed here, a relatively minimum total attenuation is achieved by the first set listed in the second row with R1=55 Ohms, R1a=390 Ohms and R1b=160 Ohms showing a total attenuation TA of 0.58.

In case of a presence of a parasitic capacitance between the positive input of the comparator C1 and electrical ground, the received signal is affected by a low pass effect with a time constant depending on the capacitance, the values of the three resistors R1, R1a and R1b, and thus reducing the maximum data rate. In this case, a choice of a set with a reasonable low value for the resistors R1a and R1b is of advantage. An example for a choice with a good trade-off between a low parasitic capacitance effect and low total attenuation is represented by second set listed in the second row of FIG. 3b.

Figures 4A, 4B:
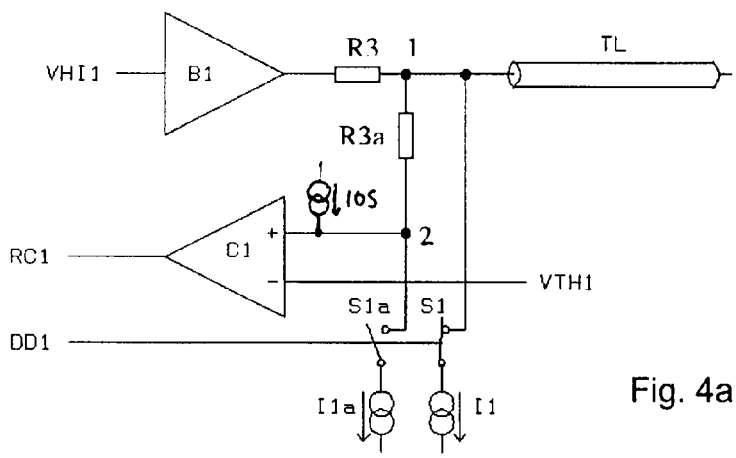
FIG. 4b shows equations pertaining to FIG. 4.a, FIG. 5 shows a variation of FIG. 3a adapted for a communication over a differential communication link.

FIG. 4a shows an alternative realization of the communication circuit of FIG. 1. Here, the first driver signal is realized by a voltage buffer B1 providing a constant buffer voltage VHI1 that is connected over a third resistor R3 to the first terminal 1 of the interface resistor R3a. In parallel, a first current I1 of a first current source is provided over a first switch S1 to the first terminal 1. The first switch S1 is controlled by the first digital data stream DD1 that switches the first current I1 on or off the first terminal 1 depending on whether the actual digital data is high or low. Further, a second current source is shown that provides a second current I1a over a second switch S1a to the second terminal 2 that is connected to the positive input of the comparator C1 as shown in FIG. 3a. The second switch S1a is also controlled by the first digital data stream DD1, but switches the second current I1a on and off the second terminal 2 complementary with respect to the first switch S1, i.e. the first switch S1 is switched off when the second switch S1a is switched on, and vice versa. Similar to the embodiment of FIG. 3a, the second input of the comparator C1 is provided with a constant threshold voltage VTH1.

The second current S1a and also the signal line at R1 and a current due to the constant voltage VHI1 provided to the transmission line in case of a low value of the digital data stream DD1 reduces the signal swing at the transmission line TL to a certain degree compared to a single current source solution. However, due to the voltage drop across the interface resistor R3a, the positive input of the comparator C1 is kept independent of the first data stream DD1, if I1a and R1a are defined correctly as exemplarily shown by the equations of FIG. 4b.

Due to the current source approach, there is no additional comparator attenuation as described under FIG. 3a and FIG.

3b. The additional driver attenuation compared to a reference setup with one single current driver is defined by the following formula: DA=(I1−I1a)/I1. In other words, a small I1a/I1 ratio combined with a large R3a/R3 ratio is a good choice that implies a small attenuation.

Similar to FIG. 3a, the presence of a parasitic capacitance between the positive input of the comparator C1 and the ground, the received signal is affected by a low pass effect with a time constant depending on the capacitance and the resistors R3 and R3a. To reduce this effect, the parallel connection of the resistors R3a and R3 should be chosen reasonably small.

Due to a voltage shift caused by the current I1a and the resistors R3 and R3a, the voltage at the second terminal 2 might be outside of an optimum range for the comparator C1. In order to shift the voltage of terminal 2 into an optimum range, an offset current IOS is provided to terminal 2 which may be realized by a constant current source. As an alternative, this current is provided by an offset resistor connected between terminal 2 and a reasonable high voltage (e.g. a voltage higher than the voltage at terminal 1).

FIG. 4b shows a first equation relating the threshold value VTH1, the buffer voltage VHI1, the third resistor R3, the first current I1 of the near communication circuit M11 as described above, and a first remote buffer voltage VHI1', a third remote resistor R3', a first remote current I1' and a second remote current I1a' of a similar remote communication circuit not shown here.

The second equation shows the value of the interface resistor R3a as a function of transmission line impedance R, the first current I1 and the second current I1a.

The third equation shows the so-called single-ended signal voltage swing (s/e-swing) at the transmission line TL as a function of the transmission line impedance R and the first and second currents I1 and I1a.

Figure 5:
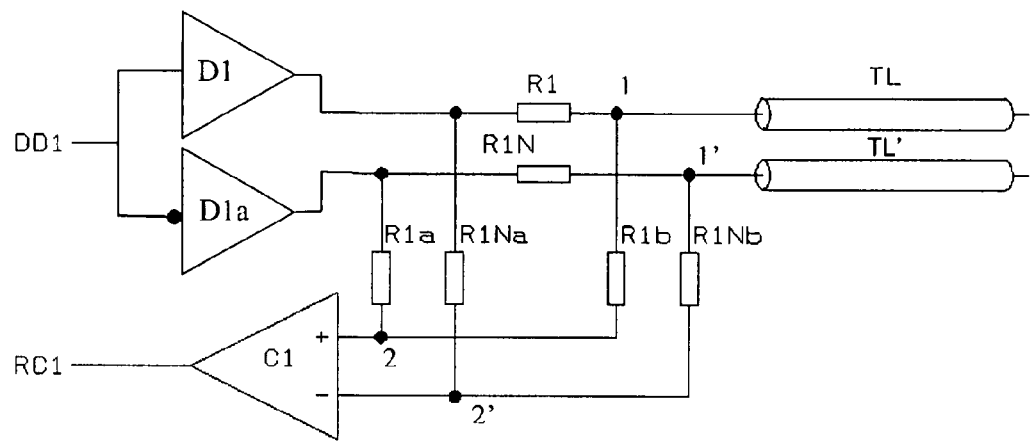

FIG. 5 shows a variation of FIG. 3a adapted for a communication in parallel over a first transmission line TL and a second or complementary transmission line TL'. The first transmission line TL1 and the complementary transmission line TL' might be spatially coupled thus forming a so-called differential line with a differential impedance.

The communication circuit M11 therefore further comprises a complementary interface circuit with a complementary interface resistance R1Nb with respect to a complementary first terminal 1' and a complementary second terminal 2'. The first complementary terminal 1' is connected to the near end of the complementary transmission line TL', and over a complementary first resistor R1N to the output of the complementary driver D1a. Instead of being connected to the threshold voltage VTH1, the second input of the voltage comparator C1 is connected to the second complementary terminal 2' that is further connected over a complementary second resistor R1Na to the output of the first driver D1.

The voltage comparator C1 generates the second digital data stream RC1 in response to the course of the voltage difference between the second terminal 2 and the second complementary terminal 2'.

Generally, the voltages of the first and second driver and the resistors of the first resistor network R1, R1a and R1b can be determined independently from the resistor of the second resistor network R1N, R1Na and R1Nb. As example and for reasons of symmetry, it is proposed to choose the following values to be similar:

first high voltage (VHI1) and the second high voltage (VHI1a), the first low voltage (VLO1) and the second low voltage (VLO1a), the first resistor (R1) and the first complementary resistor (R1N), the second resistor (R1a) and the second complementary resistor (R1Na), and the resistance of the interface circuit (R1b) and the resistance of the complementary interface circuit (R1Nb).

Figures 6A, 6B:
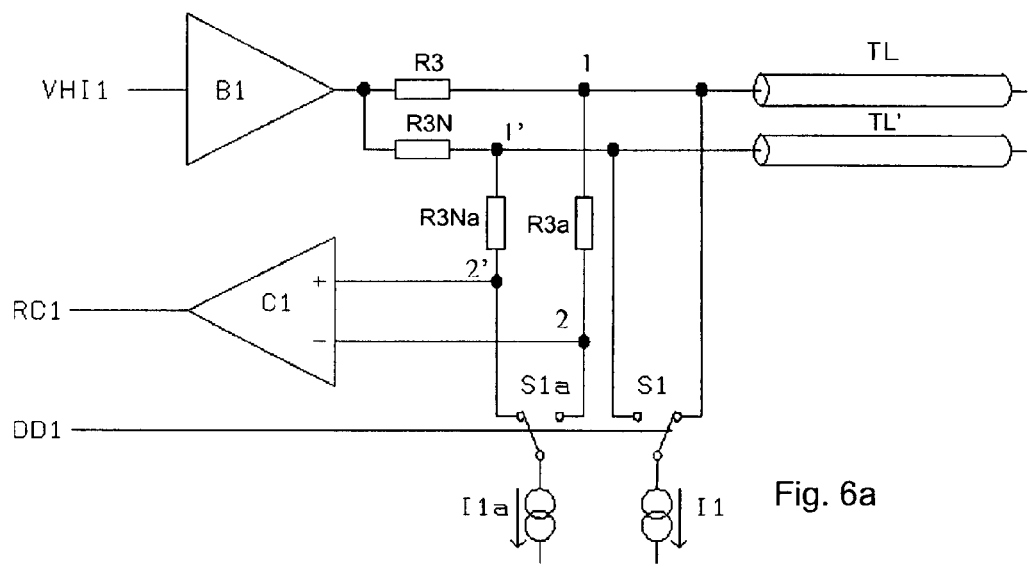
FIG. 6a shows a variation of FIG. 4a adapted for a communication over a differential data link.
FIG. 6b shows equations pertaining to FIG. 6a, FIG. 7a shows an exemplary realization of FIG. 6a within an integrated circuit FIG. 7b equations pertaining to FIG. 7a, FIG. 8a shows an exemplary realization of FIG. 4a within an integrated circuit.

FIG. 6a shows a corresponding variation of FIG. 4a adapted for a communication in parallel over a first transmission line TL and a complementary transmission line TL'. Therefore, the communication circuit M11 further comprises a complementary interface circuit with a complementary resistance R3Na with respect to a complementary first terminal 1' and a complementary second terminal 2', wherein the first switch S1 and the second switch S1a are connected with its inputs terminals to each the corresponding first and second current source I1 and I1a as shown in FIG. 4a. Additionally, both switches have an additional output terminal that is each antivalent to the existing terminals.

The first complementary terminal 1' is connected to a complementary transmission line TL', over a complementary third resistor R3N to the direct voltage driver B1, and to the antivalent output terminal of the first switch S1.

The second complementary terminal 2' is connected to the antivalent output terminal of the second switch S1a and to a second input of the voltage comparator C1.

The positive input of the voltage comparator C1 is connected to the second complementary terminal 2' and the negative input of the comparator C1 is connected to the second terminal 2. Thus, the comparator C1 generates the second digital data stream RC1 in response to the course of the voltage difference between the second terminal 2 and the second complementary terminal 2'.

Similar to the offset current IOS in FIG. 4a, offset currents might be provided to each the second terminal 2 and the complementary terminal 2' in order to shift the voltages of these terminals into an optimum range. The provision of these currents may be realized by constant current sources. As an alternative, these currents are provided by offset resistors each being connected between a reasonable high voltage source and terminal 2 and terminal 2' respectively.

By way of example the third resistor R3 is equal to the third complementary resistor R3N, and the interface resistor R3a is equal to the complementary interface resistor R3Na. FIG. 6b shows a first equation with the third (complementary) resistor R3 as a function of the transmission line impedance R, the first current I1 and the second current I1a.

The second equation shows the so-called single-ended signal voltage swing (s/e-swing) at the transmission line TL as a function of the transmission line impedance R and the first and second currents I1 and I1a.

FIG. 7a shows an example of a realization of the circuit of FIG. 6a, wherein the first and second current sources I1 and I1a and the first switch S1 and second switch S1a are realized by a common current source 10 and a plurality of equal transistors Q1a-Q1f. The emitters or sources of the transistors Q1a-Q1f are connected to the common current source 10, the collectors or drains of a first quantity n (in the example shown: n=1) of the transistors (transistor Q1a) are connected to the second terminal 2, the collectors or sources of a second quantity m (M=2) of the transistors (transistors Q1b, Q1c) are connected to the first complementary terminal 1', the collectors or drains of a third quantity n (n=1) of the transistors (transistor Q1f) are connected to the second complementary terminal 2', and the collectors or sources of a fourth quantity m (m=2) of the transistors (transistors Q1d, Q1e) are connected to the first terminal 1. The bases or gates of the first and second quantity of transistors are provided with the first digital data stream DD1 and the bases of the second and fourth quantity of transistors are provided with a complementary digital data stream DD1B.

By way of example, the first and third quantity have the number n and the second and fourth quantity have the number n, n and m being any natural number.

The ratio of the currents flowing directly or complementary via series resistors R3a, R3Na is determined by the number ratio of equal devices in making up the switch. In the example shown, the ration is m/n, (in the example shown m=2 and n=1).

Figure 7B:
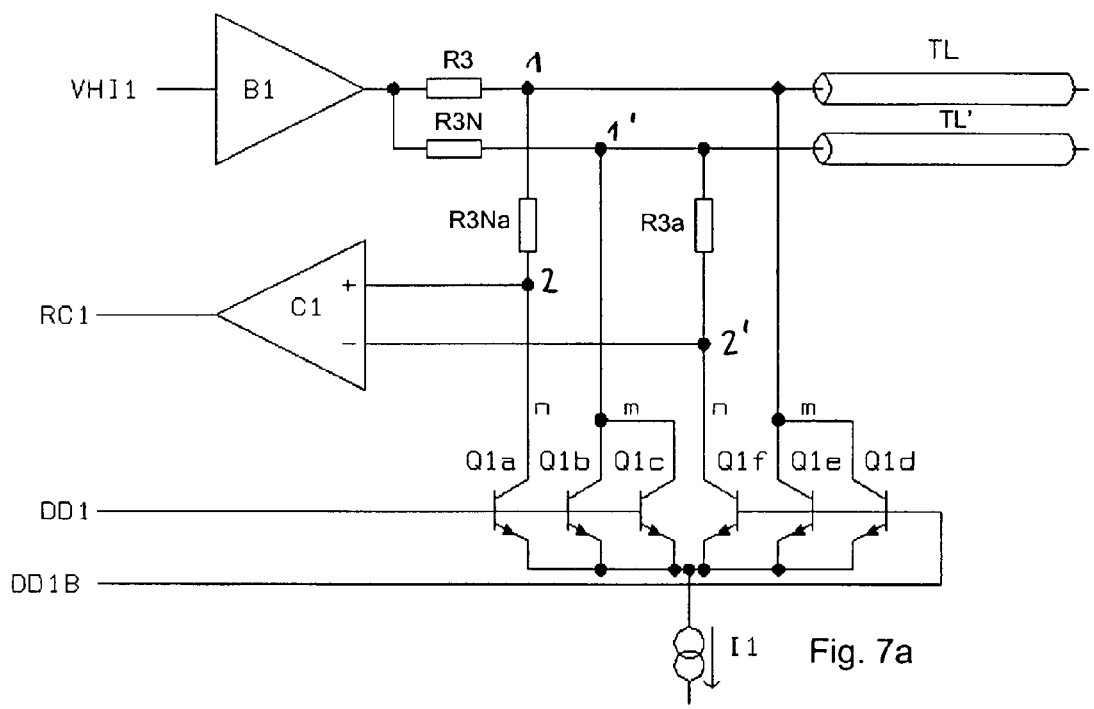

Similar to FIG. 6b and by way of example, the third resistor R3 is equal to the third complementary resistor R3N, and the interface resistor R3a is equal to the complementary interface resistor R3Na. FIG. 7b shows a first equation with the third resistor R3a (or the third complementary resistor R3Na) as a function of the transmission line impedance R and the numbers n and m.

The second equation shows the so-called single-ended signal voltage swing (s/e-swing) at the transmission line TL as a function of the transmission line impedance R the common current I1 and the numbers n and m.

In an alternative embodiment, the transistors are different in size. In this case, the ratio of the currents flowing directly or complementary via series resistors R3a, R3Na depends on the size and number ratio of the corresponding transistors. Therewith it is possible to achieve a ratio of fractional numbers.

In a further alternative, multi-collector or multi-drain transistors are used instead of single-collector or single-drain transistors.

The transistors are exemplarily shown as bipolar npn transistors. Alternatively the transistors can be realized as pnp bipolar resistors or as field effect transistors (FET's).

Due to variations of resistor values in semiconductor processes, it is difficult to correctly achieve the intended relations for the resistors and transmission line impedances. This might lead to non-ideal suppression of the transmitted signal at the comparator inputs. Therefore in an embodiment, additional current attenuators are connected between the second terminal 2 and the collectors of the first quantity of transistors (Q1a) and the complementary terminal 2' and the collectors of third quantity of transistors (Q1f). The attenuators may be controlled by digital-to-analog converters, which settings are determined by a calibration measurement. In an alternative embodiment, multiplicators are provided instead of attenuators.

Figures 8A, 8B:
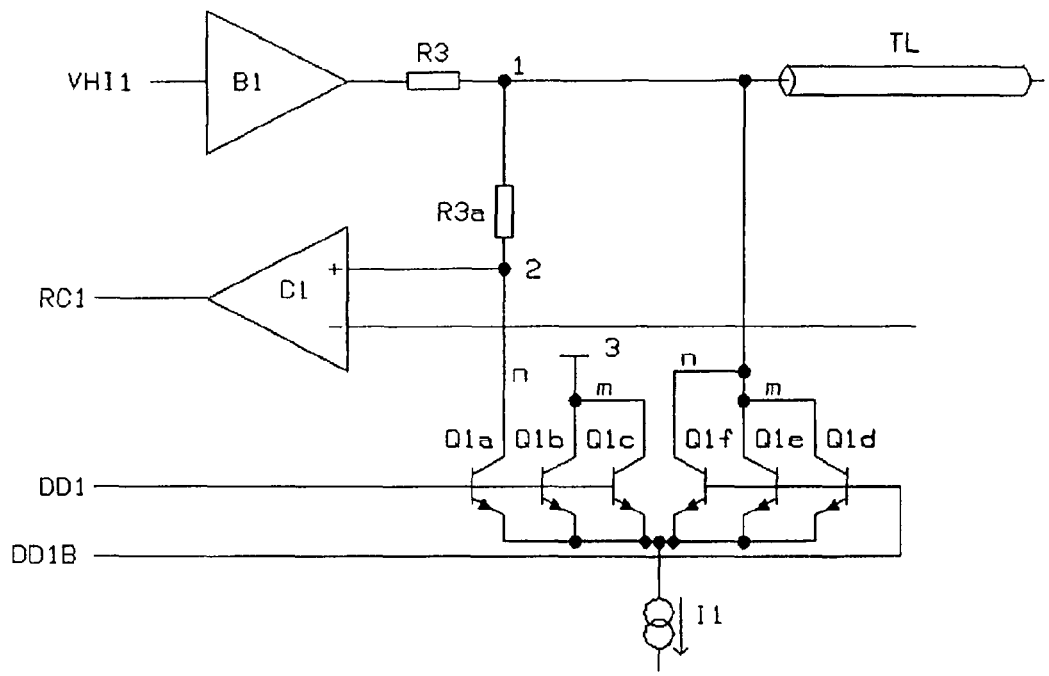
FIG. 8b shows equations pertaining to FIG. 8a, FIG. 9a shows a principle block diagram of a bi-directional communication setup according to an embodiment of the invention.

FIG. 8a shows an exemplary realization of FIG. 4a within an integrated circuit, wherein, similar to FIG. 7a, the first and second current sources I1 and I1a and the first switch S1 and second switch S1a are realized by a common current source 10 and a plurality of equal transistors Q1a-Q1f. The emitters or sources of the transistors Q1a-Q1f are connected to the common current source 10, the collectors or drains of a first quantity n (in the example shown: n=1) of the transistors (transistor Q1a) are connected to the second terminal 2, the collectors or sources of a second quantity m (M=2) of the transistors (transistors Q1b, Q1c) are connected to a terminal 3 providing an appropriate constant voltage equal or higher than the base voltage of the transistors, the collectors or drains of a third quantity n (n=1) of the transistors (transistor Q1f) together with the collectors or sources of a fourth quantity m (m=2) of the transistors (transistors Q1d, Q1e) are connected to the first terminal 1. The bases or gates of the first and second quantity of transistors are provided with the first digital data stream DD1 and the bases of the second and fourth quantity of transistors are provided with a complementary digital data stream DD1B.

Similar to FIG. 7a and by way of example, the first and third quantity have the number n and the second and fourth quantity have the number n, n and m being any natural number.

FIG. 8b shows a first equation with the third resistor R3a as a function of the transmission line impedance R and the numbers n and m.

The second equation shows the so-called single-ended signal voltage swing (s/e-swing) at the transmission line TL as a function of the transmission line impedance R the common current I1 and the numbers n and m.

While this disclosure has been described in terms of several embodiments, there are alterations, permutations, and equivalents which fall within the scope of this disclosure. It should also be noted that there are many alternative ways of implementing the methods and compositions of the present invention. It is therefore intended that the following appended claims be interpreted as including all such alterations, permutations, and equivalents as fall within the true spirit and scope of the present disclosure.

The invention claimed is:

1. A communication circuit for providing a bi-directional data transmission over a signal line, the communication circuit being adapted for receiving a first digital data stream and for transmitting a corresponding first signal into a near end of a signal line to be transmitted to a remote device, the remote device being connected to a far end of the signal line, the communication circuit being adapted for receiving a second signal at the near end of the signal line from the remote device and for deriving a second digital data stream from this signal, the communication circuit comprising:

a signal generator adapted for providing a first driver signal at a first generator output and a second driver signal at a second generator output, each in response to the first digital data stream;

an interface circuit adapted for providing, in response to the first driver signal and the second driver signal, the first signal to be transmitted to the near end of the signal line, wherein the interface circuit comprises a first terminal connected to the signal generator for receiving the first driver signal, an output connected to the near end of the signal line, and a second terminal connected to the signal driver for receiving the second driver signal, wherein the second terminal is further connected to an input of the extraction circuit; and an extraction circuit adapted for detecting the second digital data stream, in response to a comparator signal deduced from the near end of the signal line and the second driver signal;

wherein the signal generator comprises, a first driver adapted for generating at an output a first high voltage or a first low voltage depending on an actual bit value of the first digital data stream, wherein the output of the first driver is connected by a first resistor to the first terminal of the interface circuit, and a second driver adapted for generating at an output a second high voltage or a second low voltage depending on an inverted actual bit value of the first digital data stream, wherein the output of the second driver is connected by a second resistor to the second terminal of the interface circuit; the communication circuit further comprising a complementary interface circuit with a complementary resistance with respect to a complementary first terminal and a complementary second terminal, wherein the first complementary terminal is connected to a complementary transmission line and by a complementary first resistor to the output of the second driver, wherein the second complementary terminal is connected to a second input of the voltage comparator, and by a complementary second resistor to the output of the first driver, and wherein the voltage comparator generates the second digital data stream in response to the course of the voltage difference between the second terminal and the second complementary terminal.

2. The communication circuit of claim 1, wherein the extraction circuit comprises a voltage comparator adapted to sense the voltage at the second terminal and wherein a resistance of the interface circuit with respect to the first terminal and the second terminal is chosen such that a value change within the first digital data stream results in a voltage level change at the second terminal that is below a predefined voltage value.

3. The communication circuit of claim 1, wherein the following properties are substantially equal:
the first high voltage and the second high voltage,
the first low voltage and the second low voltage,
the first resistor and the first complementary resistor,
the second resistor and the second complementary resistor,
the resistance of the interface circuit and the resistance of the complementary interface circuit.

4. A communication circuit for providing a bi-directional data transmission over a signal line, the communication circuit being adapted for receiving a first digital data stream and for transmitting a corresponding first signal into a near end of a signal line to be transmitted to a remote device, the remote device being connected to a far end of the signal line, the communication circuit being adapted for receiving a second signal at the near end of the signal line from the remote device and for deriving a second digital data stream from this signal, the communication circuit comprising:

a signal generator adapted for providing a first driver signal at a first generator output and a second driver signal at a second generator output, each in response to the first digital data stream;

an interface circuit adapted for providing, in response to the first driver signal and the second driver signal, the first signal to be transmitted to the near end of the signal line, wherein the interface circuit comprises a first terminal connected to the signal generator for receiving the first driver signal, an output connected to the near end of the signal line, and a second terminal connected to the signal driver for receiving the second driver signal, wherein the second terminal is further connected to an input of the extraction circuit; and an extraction circuit adapted for detecting the second digital data stream, in response to a comparator signal deduced from the near end of the signal line and the second driver signal;

wherein the signal generator comprises a direct voltage driver adapted to provide a direct voltage connected by a resistor to the first terminal of the interface circuit and in parallel a first current source connected by a first switch to the first terminal, and a second current source connected by a second switch to the second terminal, and wherein the first switch and the second switch are arranged to be oppositely switched on or off in response to the first digital data stream.

5. The communication circuit of claim 4, further comprising a provider for providing an offset current to the second terminal, realized by a constant current source so that the voltage of the second terminal is shifted into a defined range.

6. The communication circuit of claim 4, wherein the resistance of the interface circuit is derived by the formula:

$$R3a = R3/2 \cdot (I1/I1a - 1), \text{ wherein}$$

R3a represents the resistance of the interface circuit respective to the first and second terminal, R3 represents the third resistor, I1 represents the current of the first current source, and I1a represents the current of the second current source.

7. The communication circuit of claim 4, further comprising a complementary interface circuit with a complementary resistance with respect to a complementary first terminal and a complementary second terminal, wherein the first switch and the second switch, connected with its inputs terminals to each the corresponding first and second current source, comprise each an additional antivalent output terminal, wherein the first complementary terminal is connected to a complementary transmission line, over a complementary third resistor to the direct voltage driver, and to the antivalent output terminal of the first switch, and the second complementary terminal is connected to the antivalent output terminal of the second switch and to a second input of the voltage comparator, and wherein the voltage comparator generates the second digital data stream in response to the course of the voltage difference between the second terminal and the second complementary terminal.

8. The communication circuit of claim 7, wherein the first and second current sources, first switch and second switches are provided by a common current source and a plurality of transistors, wherein the emitters or sources of the transistors are connected to the common current source, the collectors or drains of a first quantity of the transistors are connected to the second terminal, the collectors or drains of a second quantity of the transistors are connected to the first complementary terminal, the collectors or drains of a third quantity of the transistors are connected to the second complementary terminal, and the collectors or drains of a fourth quantity of the transistors are connected to the first terminal, the bases or gates of the first and second quantity of transistors are provided with the first digital data stream and the bases of the second and fourth quantity of transistors are provided with a complementary first digital data stream.

9. The communication circuit of claim 8, wherein the first and third quantity is any first natural number (n), and the second and fourth quantity is any second natural number (m).

10. An automatic test equipment -ATE- comprising a plurality of per-pin electronic circuits adapted to be connected over a plurality of transmission lines to corresponding pins of a device under test -DUT-, wherein the ATE comprises a plurality of communication circuits for providing a bi-directional data transmission over a signal line, the communication circuits being adapted for receiving a first digital data stream and for transmitting a corresponding first signal into a near end of a signal line to be transmitted to a remote device, the remote device being connected to a far end of the signal line, the communication circuits being adapted for receiving a second signal at the near end of the signal line from the remote device and for deriving a second digital data stream from this signal, the communication circuits comprising:

a signal generator adapted for providing a first driver signal at a first generator output and a second driver signal at a second generator output, each in response to the first digital data stream;

an interface circuit adapted for providing, in response to the first driver signal and the second driver signal, the first signal to be transmitted to the near end of the signal line, wherein the interface circuit comprises a first terminal connected to the signal generator for receiving the first driver signal, an output connected to the near end of the signal line, and a second terminal connected to the signal driver for receiving the second driver signal, wherein the second terminal is further connected to an input of the extraction circuit; and an extraction circuit adapted for detecting the second digital data stream, in response to a comparator signal deduced from the near end of the signal line and the second driver signal, for connecting to one of the plurality of transmission line;

wherein the signal generator comprises a direct voltage driver adapted to provide a direct voltage connected by a resistor to the first terminal of the interface circuit and in parallel a first current source connected by a first switch to the first terminal, and a second current source connected by a second switch to the second terminal, and wherein the first switch and the second switch are arranged to be oppositely switched on or off in response to the first digital data stream.

\* \* \* \* \*

UNITED STATES PATENT AND TRADEMARK OFFICE
CERTIFICATE OF CORRECTION

| | | |
|---|---|---|
| PATENT NO. | : 8,068,537 B2 | Page 1 of 1 |
| APPLICATION NO. | : 11/919388 | |
| DATED | : November 29, 2011 | |
| INVENTOR(S) | : Bernhard Roth | |

It is certified that error appears in the above-identified patent and that said Letters Patent is hereby corrected as shown below:

In the Detailed Description, column 10, line 54, "10" should read --I0--.

In the Detailed Description, column 10, line 56, "10" should read --I0--.

In the Detailed Description, column 11, line 10, "the ration is" should read --the ratio is--.

In the Detailed Description, column 11, line 51, "10" should read --I0--.

Signed and Sealed this
Second Day of October, 2012

David J. Kappos
*Director of the United States Patent and Trademark Office*